(12) United States Patent
Xu et al.

(10) Patent No.: US 12,432,077 B2
(45) Date of Patent: Sep. 30, 2025

(54) INDICATION OF DIGITAL MEDIAL INTEGRITY

(71) Applicant: Bytedance Inc., Los Angeles, CA (US)

(72) Inventors: Jizheng Xu, Los Angeles, CA (US);
Ye-kui Wang, Los Angeles, CA (US);
Li Zhang, Los Angeles, CA (US); Kai Zhang, Los Angeles, CA (US)

(73) Assignee: Bytedance Inc., Los Angeles, CA (US)

( * ) Notice: Subject to any disclaimer, the term of this patent is extended or adjusted under 35 U.S.C. 154(b) by 482 days.

(21) Appl. No.: 17/942,921

(22) Filed: Sep. 12, 2022

(65) Prior Publication Data

US 2023/0020655 A1    Jan. 19, 2023

Related U.S. Application Data

(63) Continuation of application No. PCT/US2021/021706, filed on Mar. 10, 2021.

(60) Provisional application No. 63/029,354, filed on May 22, 2020, provisional application No. 62/988,023, filed on Mar. 11, 2020.

(51) Int. Cl.
| | |
|---|---|
| *H04L 9/32* | (2006.01) |
| *H04L 9/30* | (2006.01) |
| *H04N 19/167* | (2014.01) |
| *H04N 19/174* | (2014.01) |
| *H04N 19/186* | (2014.01) |

(52) U.S. Cl.
CPC ............ *H04L 9/3297* (2013.01); *H04L 9/304* (2013.01); *H04L 9/3247* (2013.01); *H04N 19/167* (2014.11); *H04N 19/174* (2014.11); *H04N 19/186* (2014.11)

(58) Field of Classification Search
CPC ..... H04L 9/3297; H04L 9/304; H04L 9/3247; H04L 9/32; H04L 9/30; H04N 19/167; H04N 19/174; H04N 19/186
See application file for complete search history.

(56) References Cited

U.S. PATENT DOCUMENTS 6,959,384 B1 * 10/2005 Serret-Avila .......... H04L 9/3236
713/168
11,190,498 B1  11/2021 Coleridge
(Continued)

FOREIGN PATENT DOCUMENTS

CN    103493502 A    1/2014
CN    104581431 A    4/2015
(Continued)

OTHER PUBLICATIONS

Document: JVET-Q2001-vE, Bross, B., et al., "Versatile Video Coding (Draft 8)," Joint Video Experts Team (JVET) of ITU-T SG 16 WP 3 and ISO/IEC JTC 1/SC 29/WG 11 17th Meeting: Brussels, BE, Jan. 7-17, 2020, 512 pages.
(Continued)

*Primary Examiner* — Jayesh M Jhaveri
(74) *Attorney, Agent, or Firm* — Conley Rose, P.C.

(57) ABSTRACT

A method of digital media processing includes performing a conversion between a media segment and a bitstream of the media segment. The conversion conforming to a format rule and an encryption rule. The format rule specifying that verification information, which includes an indication of an integrity of a portion of the media segment, is signaled in the bitstream.

19 Claims, 9 Drawing Sheets

(56) References Cited

U.S. PATENT DOCUMENTS

| | | | |
|---|---|---|---|
| 2005/0251682 | A1 | 11/2005 | Collins et al. |
| 2008/0222420 | A1* | 9/2008 | Serret-Avila .......... H04L 9/3236 |
| | | | 713/176 |
| 2008/0313264 | A1 | 12/2008 | Pestoni |
| 2009/0168892 | A1 | 7/2009 | McFarland et al. |
| 2010/0131412 | A1 | 5/2010 | Bradley et al. |
| 2010/0177891 | A1 | 7/2010 | Keidar |
| 2012/0233345 | A1 | 9/2012 | Hannuksela |
| 2012/0317305 | A1 | 12/2012 | Einarsson et al. |
| 2014/0304515 | A1* | 10/2014 | Feuerman ............. H04L 63/123 |
| | | | 713/176 |
| 2014/0376405 | A1* | 12/2014 | Erickson ............... H04W 76/14 |
| | | | 370/254 |
| 2015/0103926 | A1* | 4/2015 | Hannuksela ......... H04N 19/119 |
| | | | 375/240.26 |
| 2015/0325243 | A1 | 11/2015 | Grant et al. |
| 2015/0381362 | A1 | 12/2015 | Thota et al. |
| 2016/0103911 | A1* | 4/2016 | Logue .................... H04L 67/04 |
| | | | 707/695 |
| 2016/0373735 | A1 | 12/2016 | Binti Abdul Hamid |
| 2017/0034523 | A1* | 2/2017 | Ebrahimi ................ H04N 5/913 |
| 2017/0132272 | A1* | 5/2017 | Khadiwala ............ H04L 63/123 |
| 2017/0208361 | A1 | 7/2017 | Dogui |
| 2017/0214701 | A1 | 7/2017 | Hasan |
| 2024/0007667 | A1* | 1/2024 | Li .......................... H04N 19/70 |
| 2024/0406431 | A1* | 12/2024 | Sánchez De La Fuente ............... |
| | | | H04N 19/172 |

FOREIGN PATENT DOCUMENTS

| | | |
|---|---|---|
| CN | 106612172 A | 5/2017 |
| CN | 109600620 A | 4/2019 |
| CN | 110602570 A | 12/2019 |
| CN | 115280791 B | 9/2024 |
| JP | 4875075 B2 * | 2/2012 ........... H04L 63/123 |

OTHER PUBLICATIONS

Suehring, K., Retrieved from the Internet: https://vcgit.hhi.fraunhofer.de/jvet/VVCSoftware_VTM/-/archive/VTM-8.0/VVCSoftware_VTM-VTM-8.0.zip, Dec. 6, 2022, 3 pages.

Document: JVET-Q2007-v6, Boyce, J., "Supplemental enhancement information for coded video bitstreams (Draft 3)," Joint Video Experts Team (JVET) of ITU-T SG 16 WP 3 and ISO/IEC JTC 1/SC 29/WG 11 17th Meeting: Brussels, BE Jan. 7-17, 2020, 81 pages.

Wikipedia, Retrieved From the Internet: https://en.wikipedia.org/wiki/Deepfake, Dec. 6, 2022, 34 pages.

Document: JVET-Q2014-v5, Nguyen, T., et al., "JVET common test conditions and software reference configurations for lossless, near lossless, and mixed lossy/lossless coding," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.

Document: JVET-R2001-v2, Boyce, J., et al., "Supplemental enhancement information for coded video bitstreams (Draft 4)," Joint Video Experts Team (JVET) of ITU-T SG 16 WP 3 and ISO/IEC JTC 1/SC 29/WG 11 18th Meeting: by teleconference, Apr. 15-24, 2020, 81 pages.

FIPS Pub 186-4, "Digital Signature Standard," Federal Information Processing Standards Publication, Computer Security, Cryptography, http://dx.doi.org/10.6028/NIST.FIPS.186-4, Jul. 2013, 40 pages.

FIPS Pub 180-4, "Secure Hash Standard," Federal Information Processing Standards Publication, Computer Security, Cryptography, http://dx.doi.org/10.6028/NIST.FIPS.180-4, Aug. 2015, 36 pages.

FIPS Pub 202, "SHA-3 Standard: Permutation-Based Hash and Extendable-Output Functions," Federal Information Processing Standards Publication, Computer Security, Cryptography, http://dx.doi.org/10.6028/NIST.FIPS.202, Aug. 2015, 37 pages.

Wikipedia, Retrieved from the Internet: https://en.wikipedia.org/wiki/Post-quantum_cryptography, Dec. 6, 2022, 15 pages.

Harran, M., et al., "A method for verifying integrity & authenticating digital media," Science Direct, Applied Computing and Informatics 14, 2018, 145-158, 14 pages.

Lederer, S., et al., "Distributed DASH Dataset," MMSys'13, Feb. 26-Mar. 1, 2013, 5 pages.

Foreign Communication From a Related Counterpart Application, International Application No. PCT/US2021/053008, International Search Report dated Dec. 28, 2021, 8 pages.

Foreign Communication From a Related Counterpart Application, International Application No. PCT/US2021/021706, International Search Report dated Jun. 25, 2021, 9 pages.

Boyce J., et al., "Supplemental Enhancement Information for Coded Video Bitstreams (Draft 3)," Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2007-v5, 82 Pages.

Bross B., et al., "Versatile Video Coding (Draft 8)," Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2001-vC, (Version 13), pp. 43-49,58-60,110-125,140-147, 508 Pages.

"VVCSoftware_VTM-VTM-8.0," Zip File, Jun. 15, 2023, 1 Page, Retrieved from URL: https://vcgit.hhi.fraunhofer.de/jvet/VVCSoftware_VTM/-/archive/VTM-8.0/VVCSoftware_VTM-VTM-8.0.zip.

Non-Final Office Action from U.S. Appl. No. 18/191,972 dated Jan. 16, 2025, 25 pages.

* cited by examiner

INDICATION OF DIGITAL MEDIAL INTEGRITY

CROSS-REFERENCE TO RELATED APPLICATION

This application is a continuation of International Application No. PCT/US2021/021706, filed on Mar. 10, 2021, which claims the priority to and benefits of U.S. Provisional Patent Application Nos. U.S. 62/988,023 filed on 11 Mar. 2020 and U.S. 63/029,354 filed on 22 May 2020. All the aforementioned patent applications are hereby incorporated by reference in their entireties.

TECHNICAL FIELD

This patent document relates to digital media coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses techniques that can be used by image, audio or video encoders and decoders for ensuring integrity of encoding operations, decoding operations, and encoded digital media segments.

In one example aspect, a method of digital media processing is disclosed. The method includes performing a conversion between a media segment and a bitstream of the media segment, wherein the conversion conforms to a format rule and an encryption rule, and wherein the format rule specifies that verification information, which comprises an indication of an integrity of a portion of the media segment, is signaled in the bitstream.

In yet another example aspect, a media processing apparatus is disclosed. The apparatus comprises a processor configured to implement above-described methods.

In yet another example aspect, a computer readable medium having code stored thereon is disclose. The code embodies one of the methods described herein in the form of processor-executable code.

These, and other, features are described throughout the present document.

DETAILED DESCRIPTION

Figure 1:
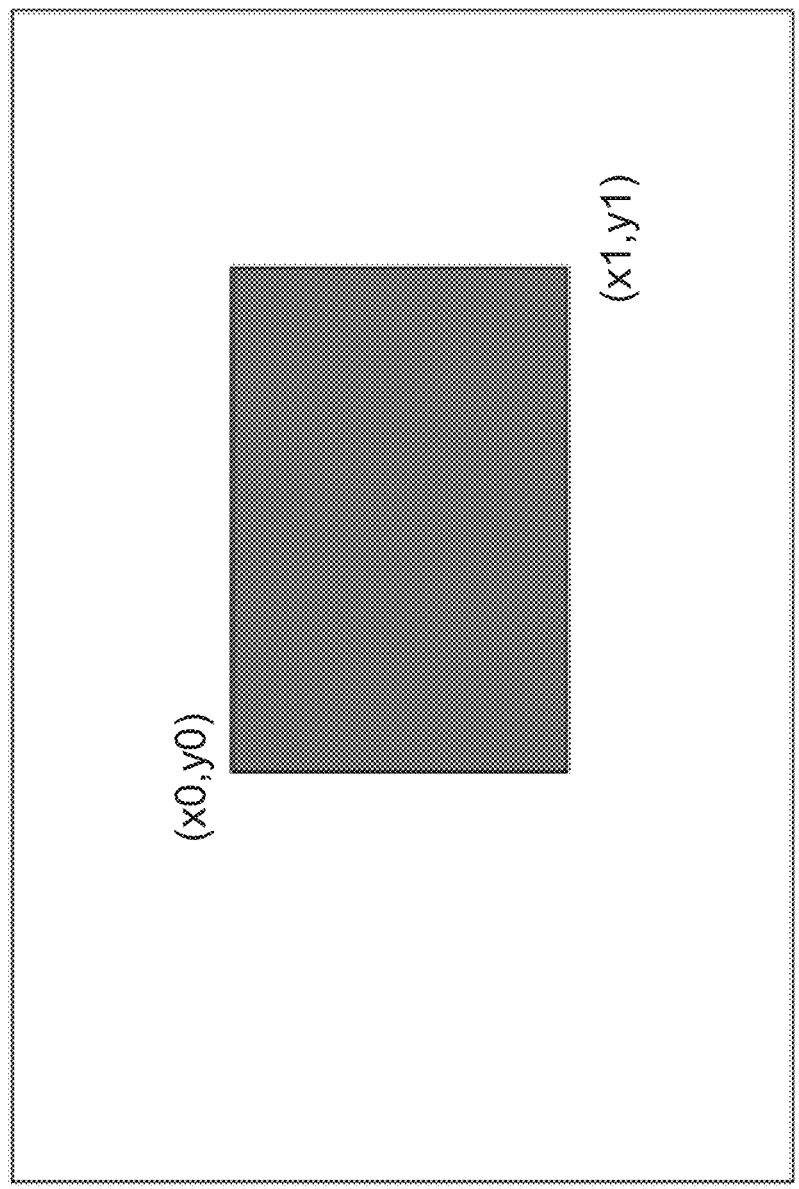
FIG. 1 shows an example of region-based image verification.

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. SUMMARY

This patent document is related to image/video system and coding technologies. Specifically, it provides a method to verify the image/video integrity, i.e., if the image/video has been modified from its certified source. It may be applicable to future image/video coding and/or system standards. It can also be applied as a core technology in general service for trustworthy image/video applications, e.g. telemedicine, source certified broadcasting.

2. INITIAL DISCUSSION

Video coding standards have evolved primarily through the development of the well-known International Telecommunication Union—Telecommunication Standardization Sector (ITU-T) and International Organization for Standardization (ISO)/International Electrotechnical Commission (IEC) standards. The ITU-T produced H.261 and H.263, ISO/IEC produced Moving Picture Experts Group (MPEG)-1 and MPEG-4 Visual, and the two organizations jointly produced the H.262/MPEG-2 Video and H.264/MPEG-4 Advanced Video Coding (AVC) and H.265/High Efficiency Video Coding (HEVC) standards. Since H.262, video coding standards are based on the hybrid video coding structure wherein temporal prediction plus transform coding are utilized. To explore future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between Video Coding Experts Group (VCEG) (Q6/16) and ISO/IEC JTC1 SC29/WG11 (MPEG) was created to work on the Versatile Video Coding (VVC) standard targeting at 50% bitrate reduction compared to HEVC.

The latest version of VVC draft, i.e., Versatile Video Coding (Draft 8) can be found at: http://phenix.int-evry.fr/jvet/doc_end_user/documents/17_Brussels/wg11/JVET-Q2001-v13.zip.

And the latest test model software can be found at: https://vcgit.hhi.fraunhofer.de/jvet/VVCSoftware_VTM/-/archive/VTM-8.0/VVCSoftware_VTM-VTM-8.0.zip.

In addition, corresponding system standards are also under development. Video usability information and supplemental enhancement information are related, where various information that may not be needed for decoder are conveyed. The latest draft document for Supplemental Enhancement Information (SEI) messages can be found at: http://phenix.int-evry.fr/jvet/doc_end_user/documents/17_Brussels/wg11/JVET-Q2007-v5.zip.

2.1. Image/Video Tempering and Deepfakes

An image/video file contains necessary information for reconstruction and related standards can guarantee the image/video can be reconstructed without any ambiguity. However, it cannot tell if the image/video has been tempered or not. With the development of deep neural network, image/video tempering is more difficult to be told. The following definition is quoted from https://en.wikipedia.org/wiki/Deepfake, a Wikipedia webpage entitled: "Deepfake" (provided by the Wikimedia Foundation of San Francisco, California).

"Deepfakes (a portmanteau of "deep learning" and "fake") are media that take a person in an existing image or video and replace them with someone else's likeness using artificial neural networks. They often combine and superimpose existing media onto source media using machine learning techniques known as autoencoders and generative adversarial networks (GANs). Deepfakes have garnered widespread attention for their uses in celebrity pornographic videos, revenge porn, fake news, hoaxes, and financial fraud. This has elicited responses from both industry and government to detect and limit their use."

2.2. Image/Video Applications Requiring Verification

Applications that might need verifications include
1. Telemedicine. For safety reason, it is desired that a related medical image/video can be verified, e.g., if it is from a certified source.
2. Image/video recording with legal effectiveness or legal enforcement. Once the image/video is recorded, it can be told if the original image/video has been tempered. Thus, any image/video that shows legal effectiveness should pass the test to tell if the video is original or not.

2.3. Secure Hash Algorithms

The Secure Hash Algorithms are a family of cryptographic hash functions published by the National Institute of Standards and Technology (NIST) as a U.S. Federal Information Processing Standard (FIPS), including:

Secure Hash Algorithm (SHA)-0: A retronym applied to the original version of the 160-bit hash function published in 1993 under the name "SHA". It was withdrawn shortly after publication due to an undisclosed "significant flaw" and replaced by the slightly revised version SHA-1.

SHA-1: A 160-bit hash function which resembles the earlier Message Digest (MD)5 algorithm. This was designed by the National Security Agency (NSA) to be part of the Digital Signature Algorithm. Cryptographic weaknesses were discovered in SHA-1, and the standard was no longer approved for most cryptographic uses after 2010.

SHA-2: A family of two similar hash functions, with different block sizes, known as SHA-256 and SHA-512. They differ in the word size; SHA-256 uses 32-byte words where SHA-512 uses 64-byte words. There are also truncated versions of each standard, known as SHA-224, SHA-384, SHA-512/224 and SHA-512/256. These were also designed by the NSA.

SHA-3: A hash function formerly called Keccak, chosen in 2012 after a public competition among non-NSA designers. It supports the same hash lengths as SHA-2, and its internal structure differs significantly from the rest of the SHA family.

The corresponding standards are FIPS Publication (PUB) 180 (original SHA), FIPS PUB 180-1 (SHA-1), FIPS PUB 180-2 (SHA-1, SHA-256, SHA-384, and SHA-512). NIST has updated Draft FIPS Publication 202, SHA-3 Standard separate from the Secure Hash Standard (SHS).

2.4. File Verification

File verification is the process of using an algorithm for verifying the integrity of a computer file. This can be done by comparing two files bit-by-bit, but requires two copies of the same file, and may miss systematic corruptions which might occur to both files. A more popular approach is to generate a hash of the copied file and compare that to the hash of the original file.

The verification process may include integrity verification and authenticity verification. File integrity can be compromised, usually referred to as the file becoming corrupted. A file can become corrupted by a variety of ways: faulty storage media, errors in transmission, write errors during copying or moving, software bugs, and so on. Hash-based verification ensures that a file has not been corrupted by comparing the file's hash value to a previously calculated value. If these values match, the file is presumed to be unmodified. Due to the nature of hash functions, hash collisions may result in false positives, but the likelihood of collisions is often negligible with random corruption. It is often desirable to verify that a file hasn't been modified in transmission or storage by untrusted parties, for example, to include malicious code such as viruses or backdoors. To verify the authenticity, a classical hash function is not enough as they are not designed to be collision resistant; it is computationally trivial for an attacker to cause deliberate hash collisions such that a malicious change in the file is not detected by a hash comparison. In cryptography, this attack is called a preimage attack. Cryptographic hash functions are employed often to counter this. As long as the hash sums cannot be tampered with—for example, if they are communicated over a secure channel—the files can be presumed to be intact. Alternatively, digital signatures can be employed to assure tamper resistance.

There are certain file formats that can support file verification, for example, a checksum file. A checksum file is a small file that contains the checksums of other files. There are a few well-known checksum file formats. Several utilities, such as md5deep, can use such checksum files to automatically verify an entire directory of files in one operation. The particular hash algorithm used is often indicated by the file extension of the checksum file. The ".sha1" file extension indicates a checksum file containing 160-bit SHA-1 hashes in shalsum format. The ".md5" file extension, or a file named "MD5SUMS", indicates a checksum file containing 128-bit MD5 hashes in md5sum format. The ".sfv" file extension indicates a checksum file containing 32-bit Cyclic Redundancy Checksum (CRC)32 checksums in simple file verification format. The "crc.list" file indicates a checksum file containing 32-bit CRC checksums in brik format. As of 2012, best practice recommendations is to use SHA-2 or SHA-3 to generate new file integrity digests; and to accept MD5 and SHA1 digests for backward compatibility if stronger digests are not available. The theoretically weaker SHA1, the weaker MD5, or much weaker CRC were previously commonly used for file integrity checks. CRC checksums cannot be used to verify the authenticity of files, as CRC32 is not a collision resistant hash function—even if the hash sum file is not tampered with, it is computationally trivial for an attacker to replace a file with the same CRC digest as the original file, meaning that a malicious change in the file is not detected by a CRC comparison.

2.5. Lossless Coding in HEVC and VVC

In VVC, lossless coding technologies are also investigated. However, although there will be coding technologies to support lossless coding, currently there is no way to guarantee that a video is losslessly coded.

To provide lossless coding, an operation configuration of VVC, i.e., JVET common test conditions and software reference configurations for lossless, near lossless, and mixed lossy/lossless coding, can be found at:

http://phenix.int-evry.fr/jvet/doc_end_user/current_document.php?id=9683

2.6. Video Usability Information (VUI)/SEI

In HEVC/VVC, a SEI message, called Decoded picture hash SEI message, is defined to verify if the decoded video is correct or not.

2.6.1. Decoded Picture Hash SEI Message Syntax

|  | Descriptor |
|---|---|
| decoded_picture_hash( payloadSize ) { |  |
|   hash_type | u(8) |
|   for( cIdx = 0; cIdx < ( chroma_format_idc = = 0 ? 1 : 3 ); cIdx++ ) |  |
|     if( hash_type = = 0 ) |  |
|       for( i = 0; i < 16; i++) |  |
|         picture_md5[ cIdx ][ i ] | b(8) |
|     else if( hash_type = = 1 ) |  |
|       picture_crc[ cIdx ] | u(16) |
|     else if( hash_type = = 2 ) |  |
|       picture_checksum[ cIdx ] | u(32) |
| } |  |

2.6.2. Decoded Picture Hash SEI Message Semantics

This message provides a hash for each colour component of the current decoded picture.

Use of this SEI message requires the definition of the following parameters:

- A picture width and picture height in units of luma samples, denoted herein by pic_width_in_luma_samples and pic_height_in_luma_samples.
- A chroma format indicator, denoted herein by chroma_format_idc.
- A bit depth for the samples of the luma component, denoted herein by $BitDepth_Y$, and when chroma_format_idc is not equal to 0, a bit depth for the samples of the two associated chroma components, denoted herein by $BitDepth_C$.
- For each colour component cIdx, an array component[cIdx][i] in raster scan order of decoded sample values in two's complement representation Prior to computing the hash, the decoded picture data are arranged into one or three strings of bytes called pictureData [cIdx] of lengths dataLen[cIdx] as follows:

```
for( cIdx = 0; cIdx < ( chroma_format_idc = = 0 ) ? 1 : 3; cIdx++ ) {
  if( cIdx = = 0 ) {
```

```
    compWidth[ cIdx ] = pic_width_in_luma_samples
    compHeight[ cIdx ] = pic_height_in_luma_samples
    compDepth[ cIdx ] = BitDepth_Y
  } else {
    compWidth[ cIdx ] = pic_width_in_luma_samples / SubWidthC
    compHeight[ cIdx ] = pic_height_in_luma_samples / SubHeightC
    compDepth[ cIdx ] = BitDepth_C
  }
  iLen = 0
  for( i = 0; i < compWidth[ cIdx ] * compHeight[ cIdx ]; i++ ) {
    pictureData[ cIdx ][ iLen++ ] = component[ cIdx ][ i ] & 0xFF
    if( compDepth[ cIdx ] > 8 )
      pictureData[ cIdx ][ iLen++ ] = component[ cIdx ][ i ] >> 8
  }
  dataLen[ cIdx ] = iLen
}
``` where component[cIdx][i] is an array in raster scan of decoded sample values in two's complement representation.

hash_type indicates the method used to calculate the checksum as specified in Table 9. Values of hash_type that are not listed in in Table 9 are reserved for future use by ITU-T|ISO/IEC and shall not be present in payload data conforming to this version of this Specification. Decoders shall ignore decoded picture hash SEI messages that contain reserved values of hash_type.

TABLE 9

Interpretation of hash_type

| hash_type | Method |
|---|---|
| 0 | MD5 (IETF RFC 1321) |
| 1 | CRC |
| 2 | Checksum | picture_md5[cIdx][i] is the 16-byte MD5 hash of the cIdx-th colour component of the decoded picture. The value of picture_md5[cIdx][i] shall be equal to the value of digestVal [cIdx] obtained as follows, using the MD5 functions defined in Internet Engineering Task Force (IETF) Request for Comments (RFC) 1321:

MD5Init(context)

MD5Update(context, pictureData[cIdx], dataLen[cIdx])

MD5Final(digestVal[cIdx], context)

picture_crc[cIdx] is the cyclic redundancy check (CRC) of the colour component cIdx of the decoded picture. The value of picture_crc[cIdx] shall be equal to the value of crcVal [cIdx] obtained as follows:

```
crc = 0xFFFF
pictureData[ cIdx ][ dataLen[ cIdx ] ] = 0
pictureData[ cIdx ][ dataLen[ cIdx ] + 1 ] = 0
for( bitIdx = 0; bitIdx < ( dataLen[ cIdx ] + 2 ) * 8; bitIdx++ ) {
  dataByte = pictureData[ cIdx ][ bitIdx >> 3 ]
  crcMsb = ( crc >> 15 ) & 1
  bitVal = ( dataByte >> ( 7 - ( bitIdx & 7 ) ) ) & 1
  crc = ( ( ( crc << 1 ) + bitVal ) & 0xFFFF ) ^ ( crcMsb * 0x1021 )
}
crcVal[ cIdx ] = crc
```

NOTE - The same CRC specification is found in Rec. ITU-T H.271.

picture_checksum[cIdx] is the checksum of the colour component cIdx of the decoded picture. The value of picture_checksum[cIdx] shall be equal to the value of checksumVal [cIdx] obtained as follows:

```
sum = 0
for( y = 0; y < compHeight[ cIdx ]; y++ )
   for( x = 0; x < compWidth[ cIdx ]; x++ ) {
      xorMask = ( x & 0xFF ) ^ ( y & 0xFF ) ^ ( x >> 8 ) ^ ( y >> 8 )
      sum = ( sum + ( ( component[ cIdx ][ y * compWidth[ cIdx ] + x ]
          & 0xFF ) ^ xorMask ) ) & 0xFFFFFFFF
      if( compDepth[ cIdx ] > 8 )
         sum = ( sum + ( ( component[ cIdx ][ y * compWidth[ cIdx ] + x
            ] >> 8 ) ^ xorMask ) ) & 0xFFFFFFFF
   }
checksumVal[ cIdx ] = sum
```

Although the SEI message can be used to detect if a picture decoded matches the corresponding picture encoded, its security is weak since MD5, CRC and Checksum are easy to be compromised.

3. EXISTING TECHNICAL PROBLEMS ADDRESSED BY DISCLOSED TECHNICAL SOLUTIONS

1. There is no a specific scheme to verify if (part or whole) of an image/video are from a certified source/encoder.
2. There is no a specific scheme to verify if (part or whole) of an image/video has been tampered.
3. There is no a specific scheme to verify if (part or whole) of an image/video is losslessly encoded, and lossless with respect to what.
4. The current decoded picture hash SEI message is not secure enough and not for part of the video.
5. There is no a specific scheme to verify if an audio are from a certified source/encoder.

4. EXAMPLE LISTING OF TECHNIQUES AND EMBODIMENTS

One aspect of the disclosure is to provide a secure mechanism to indicate if a certain part of, or the whole, image/video/audio is generated by a certified source or encoder at a certain time. Different from file verification, two signals are considered as matched if the reconstruction of the certain part matches. Thus, the verification is independent of a certain image/video/audio representation/coding standard.

The listing of items should be considered as examples to explain the general concepts and should not be interpreted in a narrow way. Furthermore, these items can be applied individually or combined in any manner.

Figure 2:
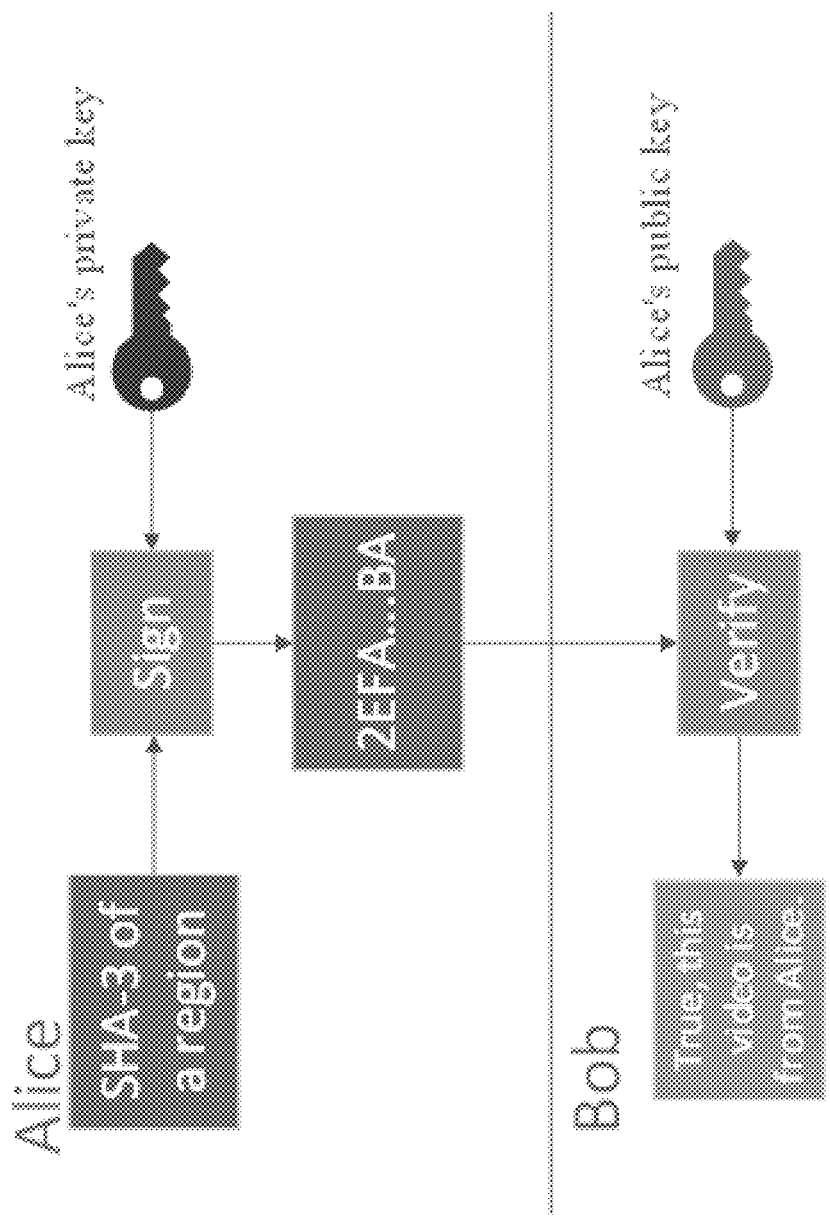
FIG. 2 shows an example of a digital signature of the secure hash value.
Figure 3:
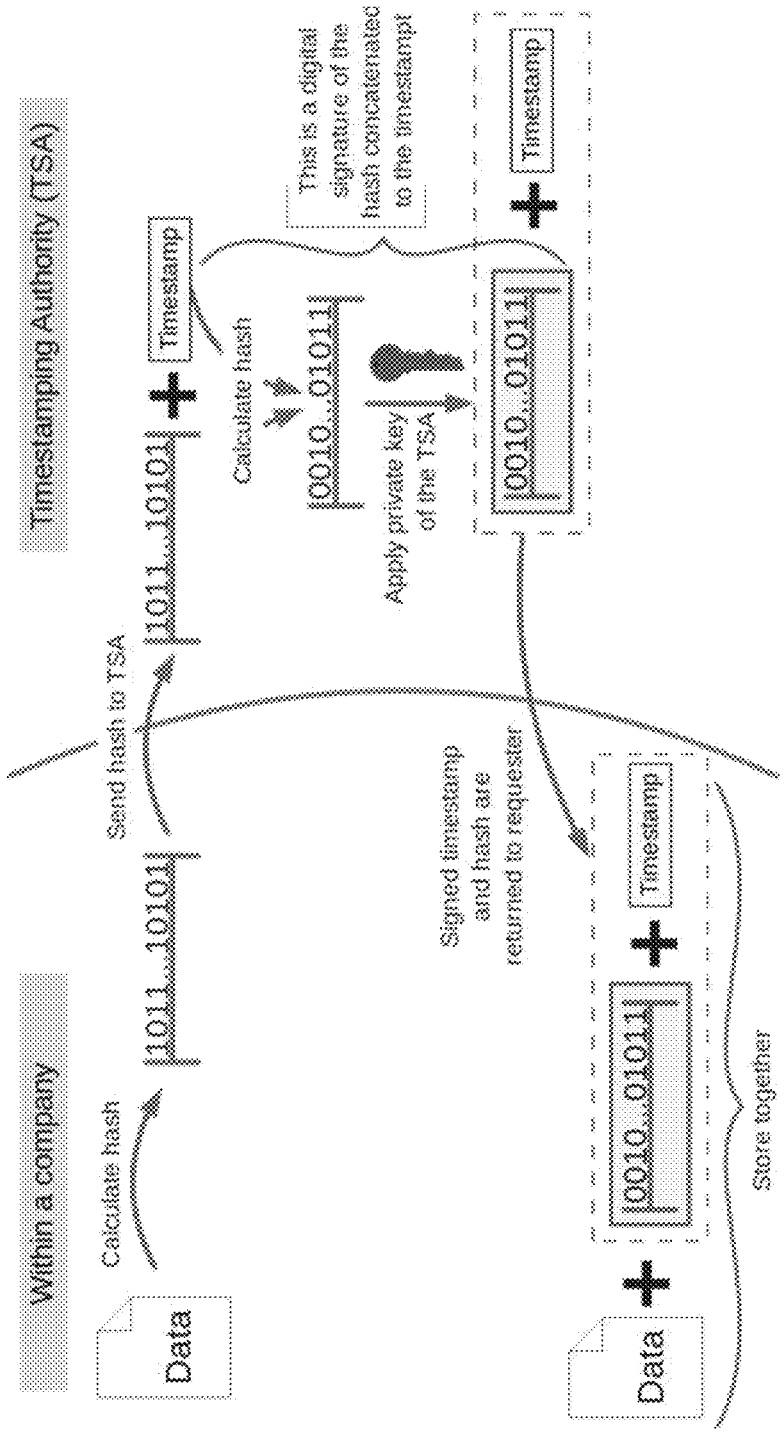
FIG. 3 shows an example of trusted timestamping.

1. One or multiple secure hash values, e.g. SHA-2, SHA-3, of an image/video/audio may be signaled to indicate the integrity of the content.
    a. As long as the secure hash values of the reconstructed value are the same, two images/videos/audios may be considered as the same.
    b. As long as the secure hash values of the reconstructed value are different, two images/videos/audios may be considered as different.
2. One or multiple secure hash values, e.g. SHA-2, SHA-3, of region of an image/video/audio may be signaled to indicate the integrity of the content.
    a. The region may be a slice, or a subpicture, or a tile, or a Coding Tree Unit (CTU) row, or a CTU.
    b. Alternatively, furthermore, indications of the region of the image/video/audio may be further signaled.
        i. In one example, the region may be denoted by the coordinates of certain positions within the region relative to a picture, such as top-left and bottom-right positions of the regions.
        ii. In one example, the region may be denoted by the unit coordinates of certain positions within the region, such as top-left and bottom-right positions of the regions.
            1. In one example, the unit is defined as a CTU/Coding Tree Block (CTB). And the unit coordinate is the coordinate of a position in terms of CTU/CTB.
        iii. In one example, the region may be a subpicture and indication of the region may be denoted by an index of subpicture.
    c. An example is shown in FIG. 1, where (x0, y0) to (x1, y1) defines the region of an image to be protected. To protect the region, SHA-3(p[x0,y0], p[x0+1,y0], . . . , p[x1,y0], p[x0,y0+1], p[x0+1,y0+1], . . . , p[x1,y0+1], . . . , p[x1,y0], p[x1,y0+1], . . . , p[x1,y1]), i.e., the secure hash value of all pixels within the region in the raster scanning order, is calculated and send to indicate the content of the image.
    d. In another example, secure hash values of regions may be signaled in an order.
        i. For example, the order may be raster-scanning order.
        ii. For example, the order may be decoding order.
        iii. For example, the order may be an ascending or descending order of indices of the regions, such as sub-picture indices, or tile indices, or slice indices, or CTU indices.
    e. In one example, the same region of multiple pictures (e.g., all pictures) within a video may be used to check the integrity of the content.
        i. E.g., indication of the region may be signaled once for the multiple pictures, e.g., being denoted by the top-left/bottom-right coordinates.
    f. Alternatively, different regions of multiple pictures (e.g., all pictures) within a video may be used to check the integrity of the content.
        i. Alternatively, furthermore, indication of the region may be signaled multiple times for the multiple pictures, e.g., being denoted by the top-left/bottom-right coordinate within a specific picture.
            1. Alternatively, furthermore, the indications of pictures (e.g., indicated by Picture Order Count (POC) value) may be further signaled.
    g. To tell whether the protected region has been tempered or not, a direct comparison of the SHA-3( ) value can be applied.
3. A private key encrypted massage of the secure hash value may be sent along with the image/video/audio to indicate the source.
    a. In one example, the digital signature system shown in FIG. 2 is used.
    b. Alternatively, the private key encryption may be applied on the image/video/audio signals directly.
    c. Alternatively, the private key encryption may be applied on the MD5/CRC/checksum of the image/video/audio.
4. A trusted timestamping message may be sent along with the secure hash value.
    a. FIG. 3 shows an example. An encoder sends the secure hash value of the signals (part or whole) encoded to a third-party timestamping authority (TSA) and the TSA then signs the hash value with timestamp information and send the signed information back. To verify whether the signals were encoded at a certain time, a decoder may use the TSA's public key to decrypt the hash value and verify whether it matches the content.
5. For an image, a secure hash value or its encrypted version of a specific region may be sent to indicate the integrity and/or the source.
   a. In one example, a region may be defined as a rectangular box with a starting point, region width and region height.
   b. In one example, a region may be defined as a starting point and a predefined closed shape.
6. For above examples, the information to be sent/signaled may be present in a specific SEI message.
   a. Alternative, furthermore, a conformance bitstream shall satisfy that the specific SEI is not present in a bitstream when certain coding tools (e.g., reference picture resampling) are enabled.
7. A conforming image decoder may obey the following constraint.
   a. In one example, a conforming image decoder shall output whether the region matches the secure hash value or not.
   b. In one example, a conforming image decoder shall output whether the region regardless of the starting point matches the secure hash value or not.
8. For audio signals, a secure hash value or its encrypted version of a specific continuous segment may be sent to indicate the integrity and/or the source.
   a. In one example, a segment may be defined by a start time and a duration of a signal.
9. A conforming audio decoder may obey the following constraint.
   a. In one example, a conforming audio decoder shall output whether the segment matches the secure hash value or not.
   b. In one example, a conforming audio decoder shall output whether the segment regardless of the starting point matches the secure hash value or not.
10. A conforming audio player may obey the following constraint.
    a. In one example, the player shall play the certified audio in order unless interaction by a human is detected.
    b. In one example, the player shall play the certified audio in a speed within a certain precision compared with the source speed.
11. For a video, a secure hash value or its encrypted version of a specific segment may be sent to indicate the integrity and/or the source.
    a. In one example, a segment of a video may be defined as a set of consecutive pictures in display order.
    b. Alternatively, furthermore, for each picture, a predefined region may be specified.
12. A conforming video decoder may obey the following constraint.
    a. In one example, a conforming video decoder shall output whether the segment matches the secure hash value or not.
    b. In one example, a conforming video decoder shall output whether the segment regardless of the starting point matches the secure hash value or not.
    c. In one example, a conforming video decoder shall output whether the segment regardless of the starting point of the segment and the starting points of each regions matches the secure hash value or not.
13. A conforming video player may obey the following constraint.
    a. In one example, a conforming video player shall play the certified video in display order.
    b. In one example, a conforming video player shall tell whether the video is certified or not and if yes, which part is certified.
    c. In one example, a conforming video player shall play the certified video in a speed within a certain precision compared with the source speed.
14. Secure hash functions may be applied to a binary bitstream.
    a. In one example, secure hash functions may be applied to a Network Abstraction Layer (NAL) unit.
    b. In one example, secure hash functions may be applied to a video coding layer NAL unit.
    c. In one example, secure hash functions may be applied to multiple NAL units.
15. DSA/RSA/ECDSA may be applied to a binary bitstream.
    a. In one example, Digital Signature Algorithm (DSA)/Rivest-Shamir-Adleman (RSA)/Elliptic Curve Digital Signature Algorithm (ECDSA) may be applied to a NAL unit.
    b. In one example, DSA/RSA/ECDSA may be applied to a video coding layer NAL unit.
    c. In one example, DSA/RSA/ECDSA may be applied to multiple NAL units.
16. Secure hash in FIPS 180-4 and FIPS 202 may be applied to part of a video sequence.
    a. In one example, secure hash listed in FIPS 180-4 and FIPS 202 may be applied to the reconstruction of a region of a picture.
    b. In one example, secure hash listed in FIPS 180-4 and FIPS 202 may be applied to the reconstruction of a region of a picture.
17. DSA/RSA/ECDSA may be applied to the reconstruction of the same region of one or multiple pictures.
    a. In one example, DSA/RSA/ECDSA may be applied to the reconstruction of the same region of one or multiple pictures until a cancelling flag is true in an SEI message.
    b. In one example, DSA/RSA/ECDSA may be applied to the reconstruction of the same region of one or multiple pictures.
18. The region definition may have a constraint.
    a. In one example, the horizontal and vertical components of the upper-left point of the region shall be always a non-negative integer.
       i. Alternatively, furthermore, the horizontal component of the upper-left point of the region shall be smaller than the picture/subpicture width.
       ii. Alternatively, furthermore, the vertical component of the upper-left point of the region shall be smaller than the picture/subpicture height.
    b. In one example, the region shall not outside of a picture or a subpicture.
    c. In one example, the region may be measured in chroma unit or luma unit.
    d. In one example, the region definition may include the starting point (in x- and/or y-direction) of the top-left location, width and height.
    e. In one example, the region definition may include the starting point (in x- and/or y-direction) of the top-left location and the ending point (in x- and/or y-direction) of the bottom-right location.

f. In one example, the width and/or height may be signaled as (the actual width and/or height minus K (K is an integer value, e.g., K=1)).
   i. Alternatively, a constraint may be added that the width and/or height shall be greater than 0.
g. In above examples, the picture/subpicture may be replaced by other video unit (e.g., a view/layer/slice/tile/number of CTUs).
19. One or multiple public keys may be enclosed in the video bitstream.
   a. In one example, one public keys may be enclosed in a SEI message.
   b. In one example, when the public key(s) are different from what a decoder gets from a trusted source, the decoder may reject the signature.
20. One or multiple domain parameters in DSA/ECDSA may be enclosed in the video bitstream.
   a. In one example, one or multiple domain parameters in DSA/ECDSA may be enclosed in a SEI message.
   b. In one example, when the domain parameters are different from what a decoder gets from a trusted source, the decoder may reject the signature.
21. For RSA signature, the following may apply
   a. RSA signature may be binarized in a big-endian manner.
   b. RSA signature may be binarized in a little-endian manner.
22. For DSA/ECDSA, let r and s be the digital signature, the following may apply
   a. r and s may be binarized in a big-endian manner.
   b. r and s may be binarized in a little-endian manner.
   c. r may be binarized before s.
   d. r may be binarized after s.
   e. r may be binarized immediately after s.
   f. s may be binarized immediately after s.
23. A digital signature may be byte-aligned in a bitstream.
   a. In one example, a digital signature may be byte-aligned in a SEI.

5. EMBODIMENTS

5.1. Embodiment #1: Secure Hash SEI of One Picture

Decoded Picture Secure Hash SEI Message Syntax

|  | Descriptor |
| --- | --- |
| decoded_picture_secure_hash( payloadSize ) { |  |
|   secure_hash_type | u(8) |
|   region_start_x | ue(v) |
|   region_start_y | ue(v) |
|   region_width | ue(v) |
|   region_height | ue(v) |
|   if( secure_hash_type = = 0 ) |  |
|     picture_SHA-3 | u(256) |
| } |  |

Decoded Picture Secure Hash SEI Message Semantics

This message provides a secure hash for a rectangular region of the current decoded picture.

Use of this SEI message requires the definition of the following variables:

A rectangular region, defined herein by region_start_x, region_start_y, region_width and region_height respectively.

A bit depth for the samples, denoted herein by BitDepthY for luma and BitDepthC for chroma.

For each colour component cIdx, an array ComponentSamples[cIdx][i][j] decoded sample values.

Prior to computing the hash, the decoded picture data are arranged into one or three strings of bytes called regionData [cIdx] of lengths dataLen as follows:

```
dataLen = 0
for( cIdx = 0; cIdx < ( ChromaFormatIdc = = 0 ) ? 1 : 3; cIdx++ ) {
  if( cIdx = = 0 ) {
    compStartX[ cIdx ] = PicWidthInLumaSamples
    compStartY[ cIdx ] = PicHeightInLumaSamples
    regionWidth = region_width
    regionHeight = region_height
    compDepth[ cIdx ] = BitDepthY
  } else {
    compStartX[ cIdx ] = PicWidthInLumaSamples / SubWidthC − region_start_x / SubWidthC
    compStartY[ cIdx ] = PicHeightInLumaSamples / SubHeightC − region_start_y / SubHeightC
    regionWidth = region_width / SubWidthC
    regionHeight = region_height / SubHeightC
    compDepth[ cIdx ] = BitDepthC
  }
  for( i = 0; i < regionHeight; i++ ) {
    for( j = 0; j < regionWidth; j++ ) {
      regionData[ cIdx ][ dataLen++ ] = ComponentSamples[ cIdx ][ i − compStartY ][ j − compStartX ] & 0xFF
        if( compDepth[ cIdx ] > 8 )
          pictureData[ cIdx ][ dataLen++ ] = ComponentSamples[ cIdx ] [ i − compStartY ][ j − compStartX ] >> 8
    }
  }
}
``` secure_hash_type indicates the method used to calculate the secure hash value. SHA-3(256, 256) is used if secure_hash_type is equal to 0.
SHA-3(256, 256) is defined by the NIST standard
https://nvlpubs.nist.gov/nistpubs/FIPS/NIST.FIPS.202.pdf

5.2. Embodiment #2: Digital Signature SEI Message

Digital Signature SEI Message Syntax

|  | Descriptor |
|---|---|
| digital_signature( payloadSize ) { |  |
|   ds_cancel_flag | u(1) |
|   if ( !ds_cancel_flag ) { |  |
|     ds_persistent_flag | u(1) |
|     ds_reserved_zero_bit | u(1) |
|     ds_type | u(3) |
|     ds_secure_hash_type | u(8) |
|     ds_single_component_flag | u(1) |
|     ds_region_params_present_flag | u(1) |
|     if( ds_region_params_present_flag ) { |  |
|       ds_region_start_left | u(16) |
|       ds_region_start_top | u(16) |
|       ds_region_width | u(16) |
|       ds_region_height | u(16) |
|     } |  |
|     ds_digital_signature | u(v) |
|   } |  |
| } |  |

Digital Signature SET Message Semantics

This message provides a secure hash for a rectangular region of the associated decoded pictures.

Use of this SEI message requires the definition of the following variables:

- A picture width and picture height in units of luma samples, denoted herein by PicWidthInLumaSamples and PicHeightInLumaSamples, respectively.
- A chroma format indicator, denoted herein by ChromaFormatIdc, as described in clause 7.2 of JVET-R2007-v2.
- A bit depth for the samples of the luma component, denoted herein by $BitDepth_Y$, and when ChromaFormatIdc is not equal to 0, a bit depth for the samples of the two associated chroma components, denoted herein by $BitDepth_C$.
- For each colour component cIdx, an array ComponentSamples[cIdx][i] in raster scan order of decoded sample values in two's complement representation.

ds_cancel_flag equal to 1 indicates that the SEI message cancels the persistence of any previous digital signature SEI message in decoding order. ds_cancel_flag equal to 0 indicates that digital signature information follows.

ds_persistence_flag specifies the persistence of the digital signature SEI message for the current layer.

ds_persistence_flag equal to 0 specifies that the digital signature SEI message applies to the current decoded picture only.

ds_persistence_flag equal to 1 specifies that the digital signature SEI message applies to the current decoded picture and persists for all subsequent pictures of the current layer in output order until one or more of the following conditions are true:

- A new Coded Layer Video Sequence (CLVS) of the current layer begins.
- The bitstream ends.
- A picture in the current layer in an Access Unit (AU) associated with a digital signature SEI message that follows the current picture in decoding order.

Let the number of decoded pictures associated with a digital signature SEI message with ds_cancel_flag equal to 0, be numAssociatedPics.

Prior to computing the hash, the decoded picture data are arranged into one or three strings of bytes called regionData[cIdx] of lengths dataLen as follows:

```
dataLen = 0
for( i = 0; i < numAssociatedPics; i++) {
  for( cIdx = 0; cIdx < ds_single_component_flag ? 1 : 3; cIdx++ ) {
    if( cIdx = = 0 ) {
      startX[ cIdx ] = ds_region_start_left * SubWidthC
      startY[ cIdx ] = ds_region_start_top * SubHeightC
      regionWidth = ds_region_width * SubWidthC
      regionHeight = ds_region_height * SubHeightC
      compDepth[ cIdx ] = BitDepth_Y
    } else {
      startX[ cIdx ] = ds_region_start_left
      startX[ cIdx ] = ds_region_start_top
      regionWidth = ds_region_width
      regionHeight = ds_region_height
      compDepth[ cIdx ] = BitDepth_C
    }
    for( i = 0; i < regionHeight; i++ ) {
      for( j = 0; j < regionWidth; j++ ) {
        regionData[ cIdx ][ dataLen++ ] = ComponentSamples[ cIdx ][ i + startY ][ j + startX ] & 0xFF
        if( compDepth[ cIdx ] > 8 )
          regionData[ cIdx ][ dataLen++ ] = ComponentSamples[ cIdx ][ i ] >> 8
      }
    }
  }
}
``` ds_reserved_zero_bit shall be equal to 0. The value 1 for ds_reserved_zero_bit is reserved for future use by ITU-T|ISO/IEC.

ds_type indicates the method used to calculate the digital signature as specified in the following table. Values of ds_type that are not listed in in the table are reserved for future use by ITU-T|ISO/IEC and shall not be present in payload data conforming to this version of this Specification. Decoders shall ignore digital signature SEI messages that contain reserved values of ds_type.

| digital_signature_type | Method |
|---|---|
| 0 | DSA (2048, 256) (FIPS 186-4) |
| 1 | RSA |
| 2 | ECDSA | ds_secure_hash_type indicates the method used to calculate the hash value as specified in the following table. Values of ds_secure_hash_type that are not listed in in the table are reserved for future use by ITU-T|ISO/IEC and shall not be present in payload data conforming to this version of this Specification. Decoders shall ignore secure picture hash SEI messages that contain reserved values of ds_secure_hash_type.

| secure_hash_type | Method |
|---|---|
| 0 | SHA-512/256 (FIPS 180-4) |
| 1 | SHA-512/224 (FIPS 180-4) | ds_single_component_flag equal to 1 specifies that the pictures associated with the digital signature SEI message contains a single colour component. ds_single_component_flag equal to 0 specifies that the pictures associated with the digital signature SEI message contains three colour components. The value of ds_single_component_flag shall be equal to (ChromaFormatIdc==0).

ds_region_params_present_flag equal to 1 specifies that ds_region_start_left, ds_region_start_top, ds_region_width and ds_region_height are present. ds_region_params_present_flag equal to 0 specifies that ds_region_start_left, ds_region_start_top, ds_region_width and ds_region_height are not present.

If the SEI message is contained in a scalable nesting SEI message with sn_subpic_flag equal to 1, the variable subpicFlag is set equal to 1. Otherwise (the SEI message is not contained in a scalable nesting SEI message with sn_subpic_flag equal to 1), subpicFlag is equal to 0.

ds_region_start_left and ds_region_start_top specify the left and right offsets of the upper left corner of the region relative to the upper left corner of the decoded picture (when subpicFlag is equal to 0) or the decoded subpicture (when subpicFlag is equal to 1), in units of chroma samples. When ds_region_params_present_flag is equal to 0, the values of ds_region_start_left and ds_region_start_top are both inferred to be equal to 0.

ds_region_width and ds_region_height specifies the width and height, respectively, of the region in units of chroma sample. When ds_region_params_present_flag is equal to 0, the values of ds_region_width and ds_region_height are inferred to be the width and height, respectively, of the decoded picture (when subpicFlag is equal to 0) or the decoded subpicture (when subpicFlag is equal to 1), in units of chroma samples.

It is required that when present, both ds_region_width and ds_region_height shall be larger or equal to 1. The value of (ds_region_start_left+ds_region_width) shall be less than or equal to the width of the decoded picture (when subpicFlag is equal to 0) or the decoded subpicture (when subpicFlag is equal to 1) in units of chroma samples.

The value of (ds_region_start_top+ds_region_height) shall be less than or equal to the height of the decoded picture (when subpicFlag is equal to 0) or the decoded subpicture (when subpicFlag is equal to 0) in units of chroma samples.

digital_signature specifies information including multiple bytes for verification the integrity of the protected region.

For DSA(2048, 256), the digital signature contains two integers, r and s, both of them are of 256 bits. The syntax element is 64 bytes, having a value dsVal defined as follows:

```
dsVal = 0
for( i = 248; i >= 0; i -= 8 )
    dsVal += r >> i & 0xFF
dsVal = dsVal << 256
for( i = 248; i >= 0; i -= 8 )
    dsVal += s >> i & 0xFF
```

Figure 4:
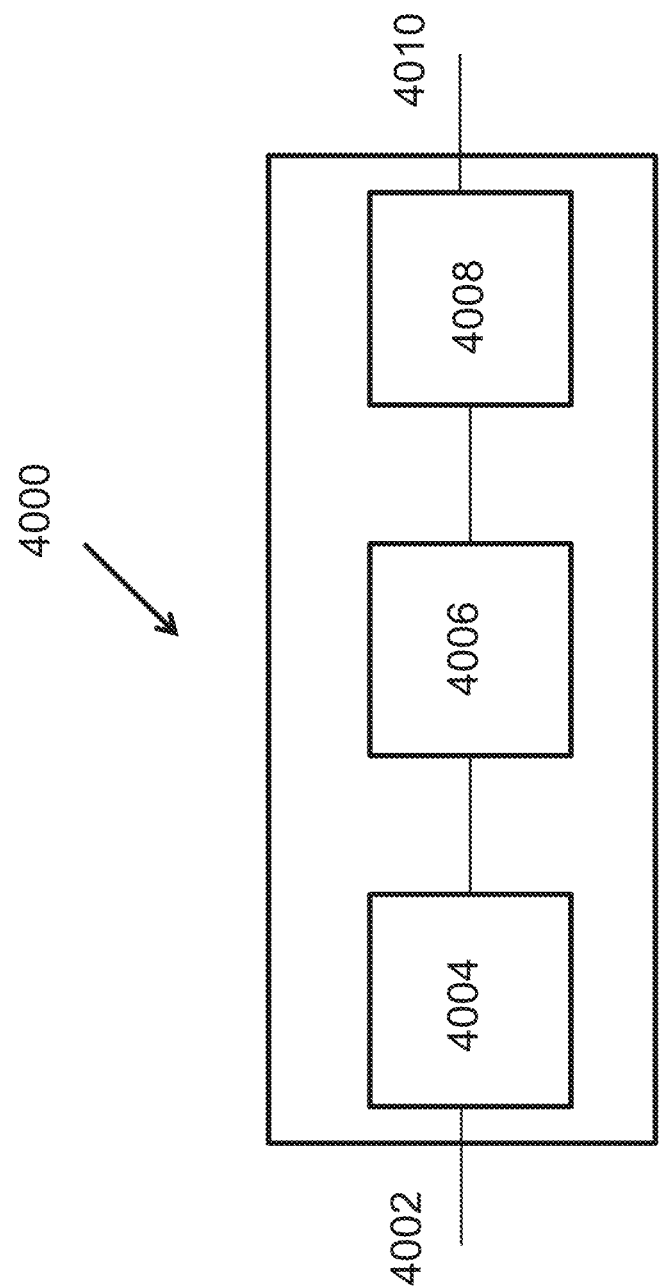
FIG. 4 is a block diagram of an example video processing system.

FIG. 4 is a block diagram showing an example video processing system 4000 in which various techniques disclosed herein may be implemented. Various implementations may include some or all of the components of the system 4000. The system 4000 may include input 4002 for receiving video content. The video content may be received in a raw or uncompressed format, e.g., 8 or 10 bit multi-component pixel values, or may be in a compressed or encoded format. The input 4002 may represent a network interface, a peripheral bus interface, or a storage interface. Examples of network interface include wired interfaces such as Ethernet, passive optical network (PON), etc. and wireless interfaces such as wireless fidelity (WI-FI) or cellular interfaces.

The system 4000 may include a coding component 4004 that may implement the various coding or encoding methods described in the present document. The coding component 4004 may reduce the average bitrate of video from the input 4002 to the output of the coding component 4004 to produce a coded representation of the video. The coding techniques are therefore sometimes called video compression or video transcoding techniques. The output of the coding component 4004 may be either stored, or transmitted via a communication connected, as represented by the component 4006. The stored or communicated bitstream (or coded) representation of the video received at the input 4002 may be used by the component 4008 for generating pixel values or displayable video that is sent to a display interface 4010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 5:
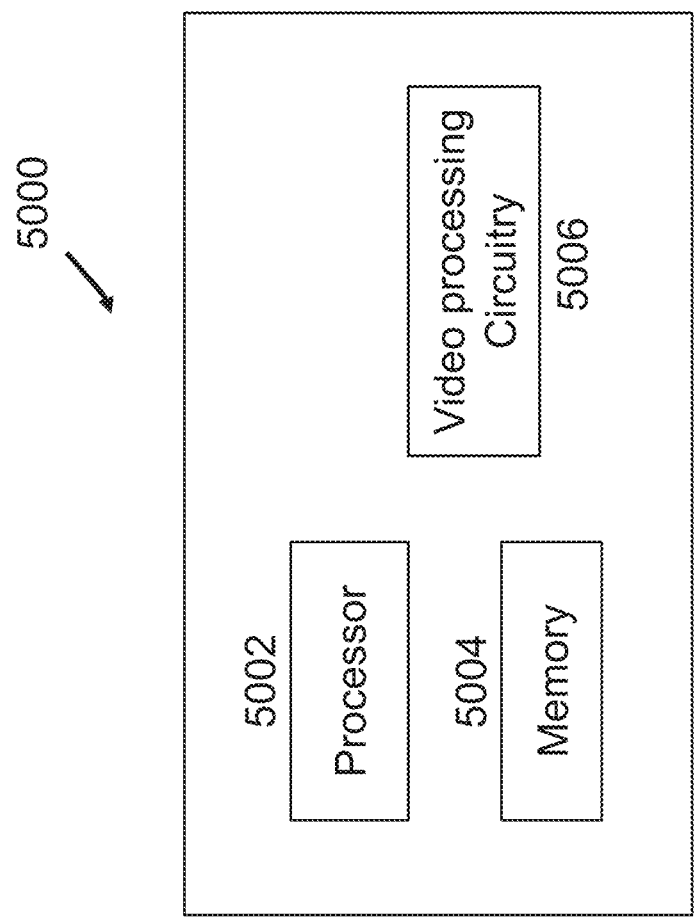
FIG. 5 is a block diagram of a video processing apparatus.

FIG. 5 is a block diagram of a video processing apparatus 5000. The apparatus 5000 may be used to implement one or more of the methods described herein. The apparatus 5000 may be embodied in a smartphone, tablet, computer, Internet of Things (IoT) receiver, and so on. The apparatus 5000 may include one or more processors 5002, one or more memories 5004 and video processing hardware 5006. The processor(s) 5002 may be configured to implement one or more methods described in the present document. The memory (memories) 5004 may be used for storing data and code used for implementing the methods and techniques described herein. The video processing hardware 5006 may be used to implement, in hardware circuitry, some techniques described in the present document. In some embodiments, the hardware 5006 may be partly or entirely in the one or more processors 5002, e.g., a graphics processor.

Figure 6:
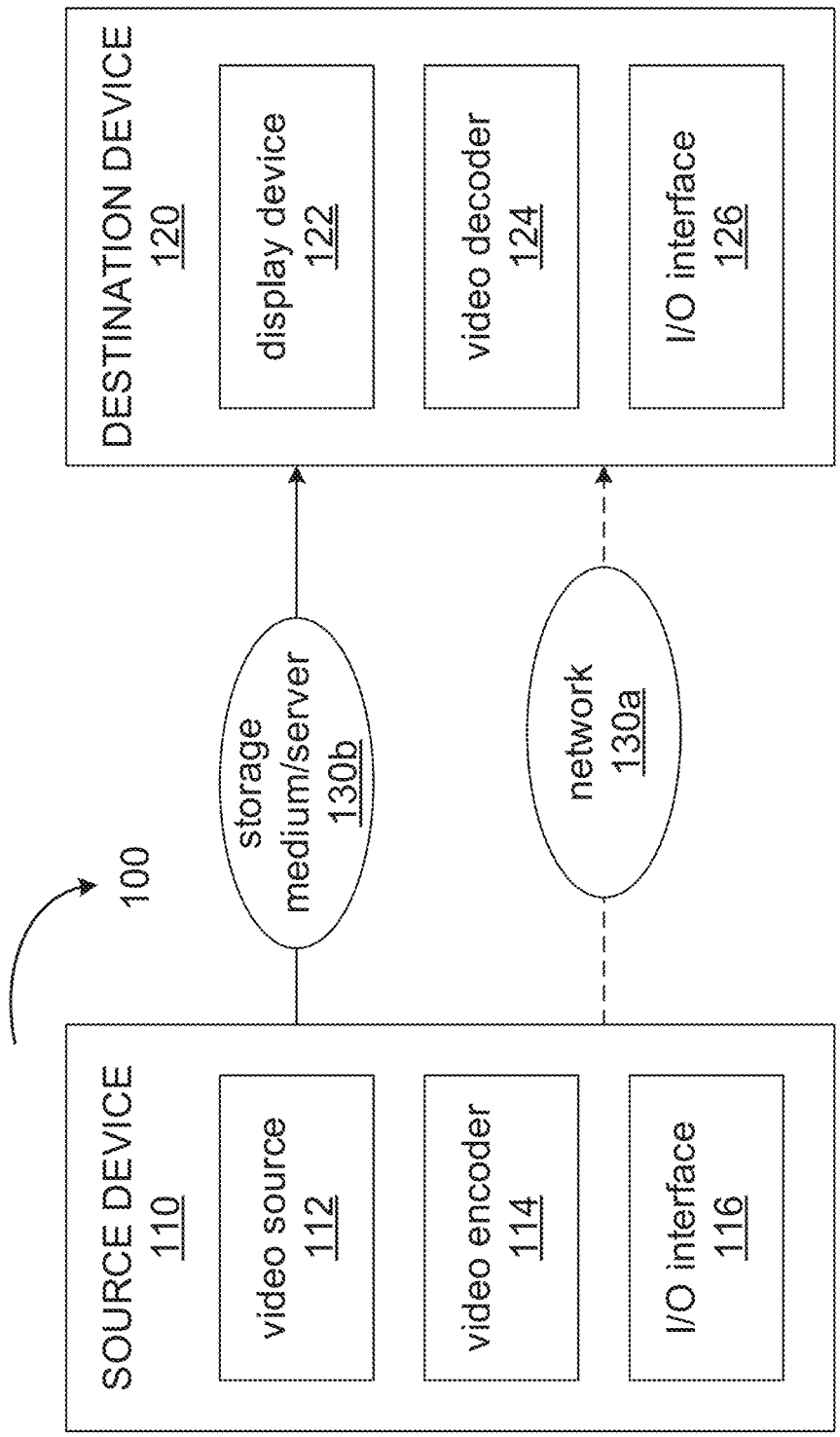
FIG. 6 is a block diagram that illustrates a video coding system in accordance with some embodiments of the present disclosure.

FIG. 6 is a block diagram that illustrates an example video coding system 100 that may utilize the techniques of this disclosure.

As shown in FIG. 6, video coding system 100 may include a source device 110 and a destination device 120. Source device 110 generates encoded video data which may be referred to as a video encoding device. Destination device 120 may decode the encoded video data generated by source device 110 which may be referred to as a video decoding device.

Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVC) standard and other current and/or further standards.

Figure 7:
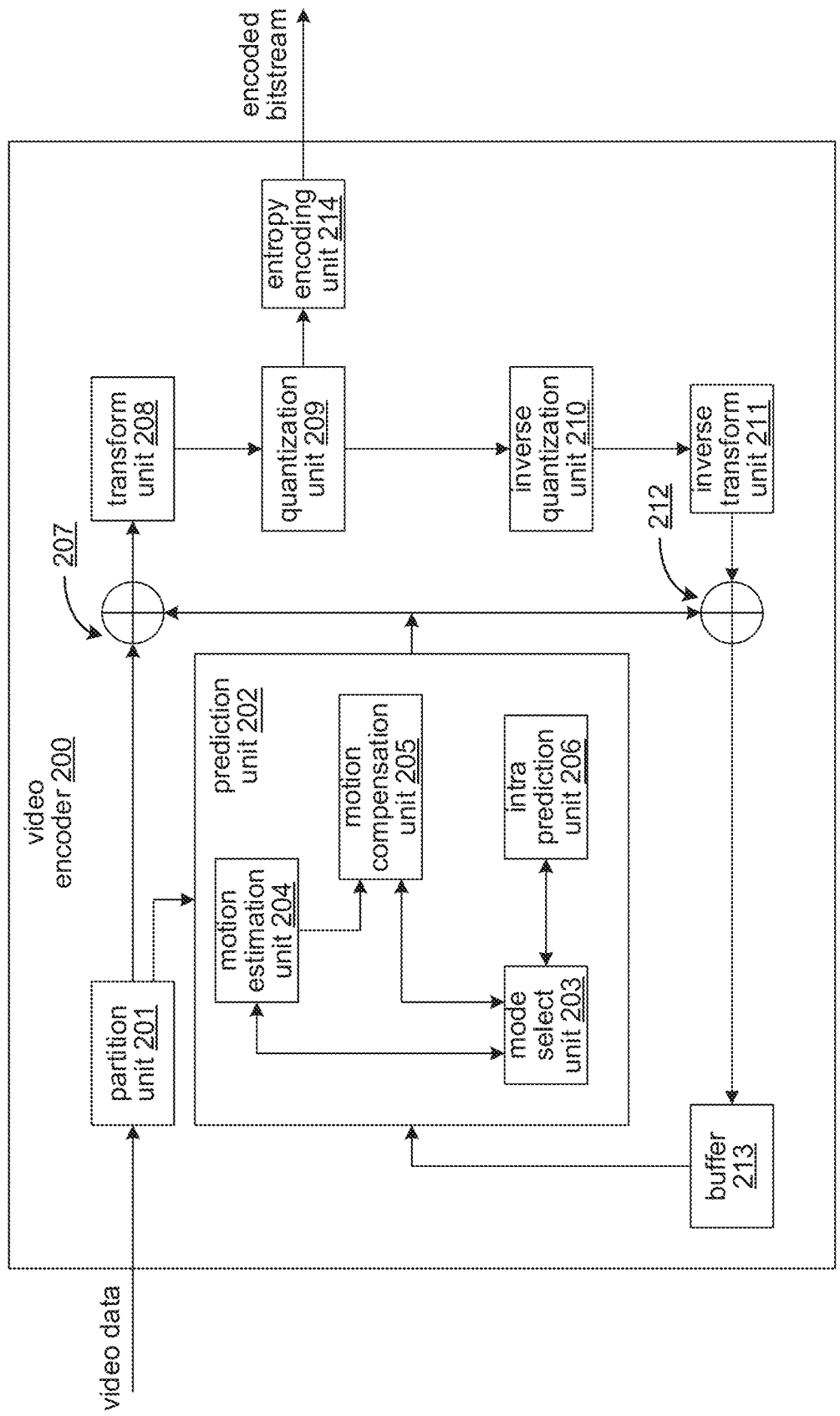
FIG. 7 is a block diagram that illustrates an encoder in accordance with some embodiments of the present disclosure.

FIG. 7 is a block diagram illustrating an example of video encoder 200, which may be video encoder 114 in the system 100 illustrated in FIG. 6.

Video encoder 200 may be configured to perform any or all of the techniques of this disclosure. In the example of FIG. 7, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a prediction unit 202 which may include a mode select unit 203, a motion estimation unit 204, a motion compensation unit 205 and an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, prediction unit 202 may include an intra block copy (IBC) unit. The IBC unit may perform prediction in an IBC mode in which at least one reference picture is a picture where the current video block is located.

Furthermore, some components, such as motion estimation unit 204 and motion compensation unit 205 may be highly integrated, but are represented in the example of FIG. 7 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter prediction (CIIP) mode in which the prediction is based on an inter prediction signal and an intra prediction signal. Mode select unit 203 may also select a resolution for a motion vector (e.g., a sub-pixel or integer pixel precision) for the block in the case of inter-prediction.

To perform inter prediction on a current video block, motion estimation unit 204 may generate motion information for the current video block by comparing one or more reference frames from buffer 213 to the current video block. Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may do not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as another video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector prediction (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the prediction unit 202 to produce a reconstructed video block associated with the current block for storage in the buffer 213.

After reconstruction unit 212 reconstructs the video block, loop filtering operation may be performed reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 8:
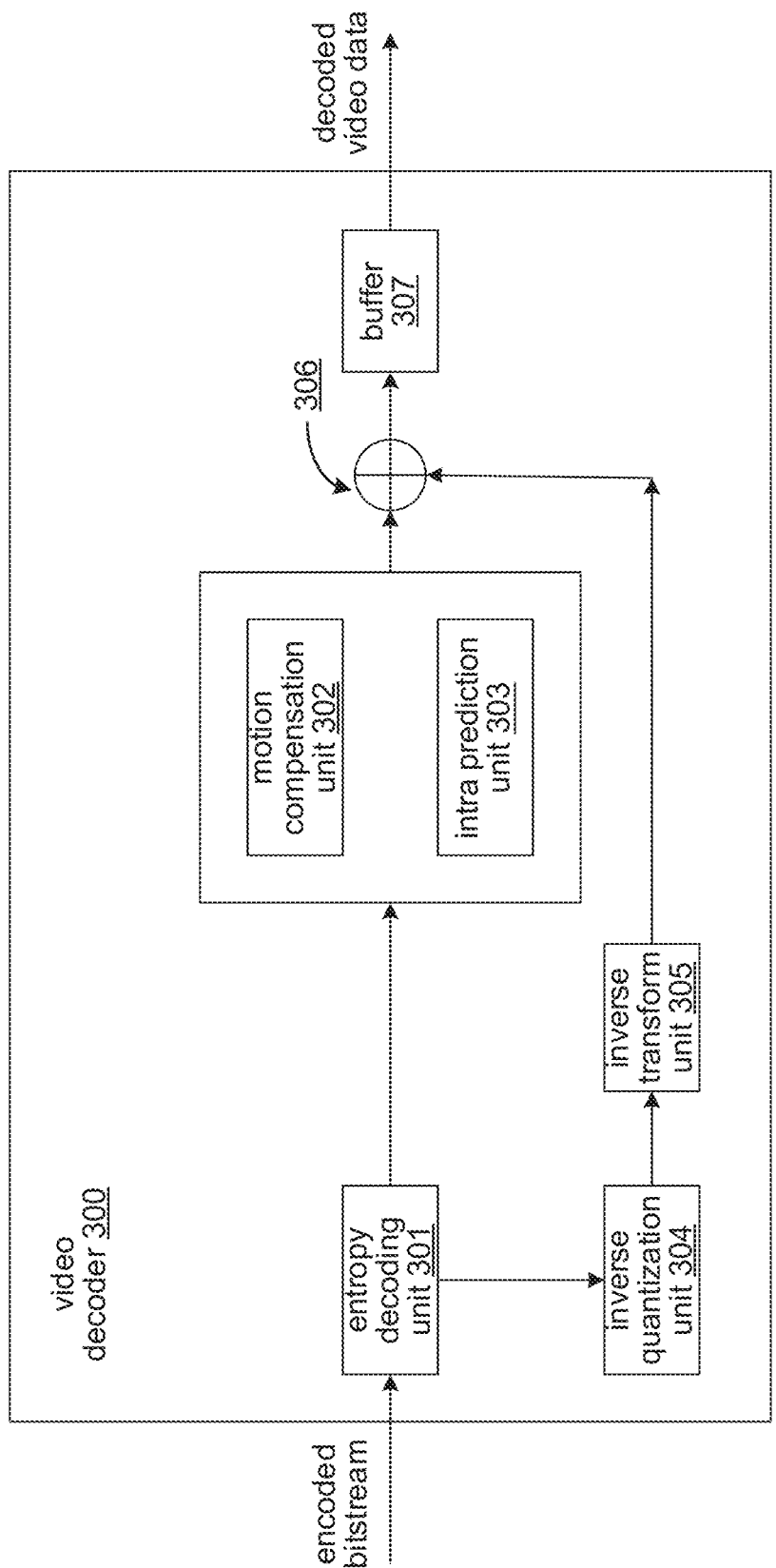
FIG. 8 is a block diagram that illustrates a decoder in accordance with some embodiments of the present disclosure.

FIG. 8 is a block diagram illustrating an example of video decoder 300 which may be video decoder 114 in the system 100 illustrated in FIG. 6.

The video decoder 300 may be configured to perform any or all of the techniques of this disclosure. In the example of FIG. 8, the video decoder 300 includes a plurality of functional components. The techniques described in this disclosure may be shared among the various components of the video decoder 300. In some examples, a processor may be configured to perform any or all of the techniques described in this disclosure.

In the example of FIG. 8, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 7).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may uses some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 303 inverse quantizes, i.e., de-quantizes, the quantized video block coefficients provided in the bitstream and decoded by entropy decoding unit 301. Inverse transform unit 303 applies an inverse transform.

Reconstruction unit 306 may sum the residual blocks with the corresponding prediction blocks generated by motion compensation unit 202 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra prediction and also produces decoded video for presentation on a display device.

Figure 9:
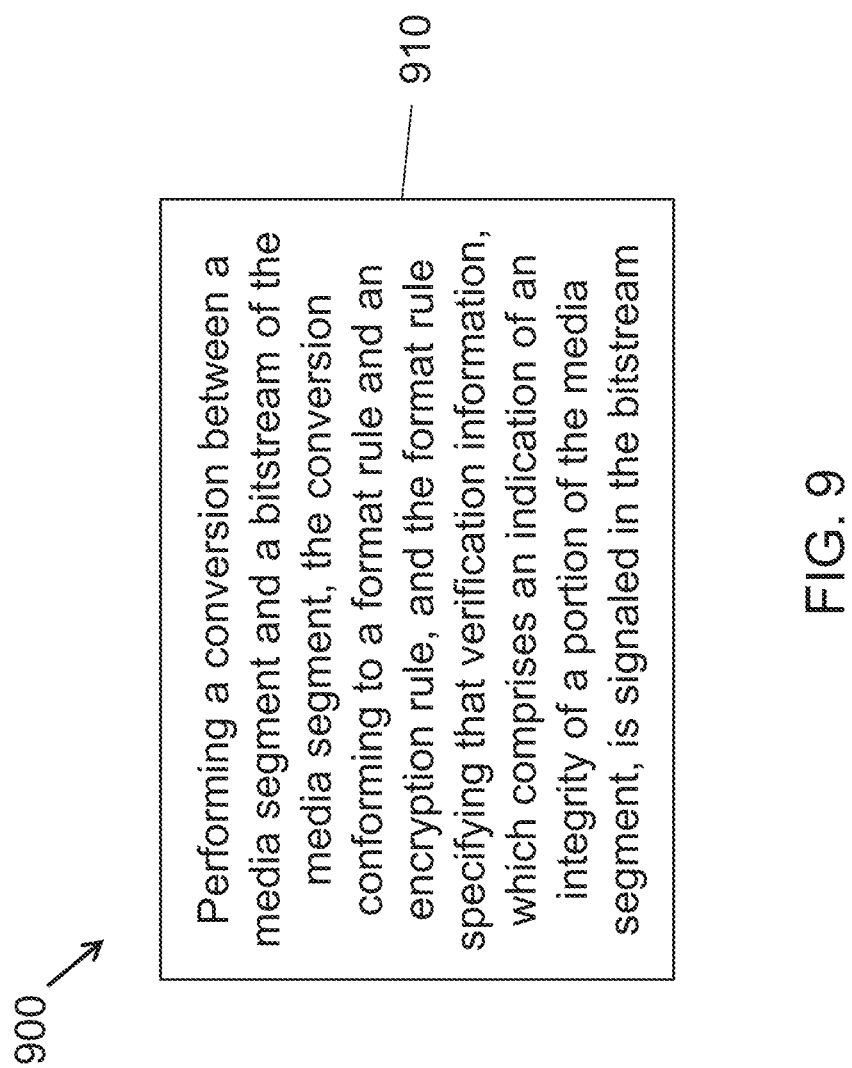
FIG. 9 is a flowchart for an example method of digital media processing.

FIG. 9 shows an example method that can implement the technical solution described above in, for example, the embodiments shown in FIGS. 4-8.

FIG. 9 shows a flowchart for an example method 900 of video processing. The method 900 includes, at operation 910, performing a conversion between a media segment and a bitstream of the media segment, the conversion conforming to a format rule and an encryption rule, and the format rule specifying that verification information, which comprises an indication of an integrity of a portion of the media segment, is signaled in the bitstream.

A listing of solutions preferred by some embodiments is provided next.

P1. A method of digital media processing, comprising performing a verification of integrity of an encoded representation of a media segment by processing a portion of the media segment; and presenting a decoded version of the encoded representation of the media segment according to a result of the verification.

P2. The method of solution P1, wherein the performing the verification includes comparing a secure hash value of a decoded version of the portion with a secure hash values included with the encoded representation.

P3. The method of solution P1, wherein the performing the verification includes authenticating a digital signature of the encoded representation of the media segment and/or the portion of the media segment.

P4. The method of solution P1, wherein the encoded representation of the media segment includes timestamps that and the performing the verification includes verifying integrity of the timestamps by obtaining secure information from a trusted source and verifying that the secure information matches the timestamps.

P5. The method of any of solutions P1 to P4, wherein the encoded representation carries a syntax element indicative of the portion of the media segment.

P6. The method of solution P5, wherein the syntax element comprises a supplemental enhancement information (SEI).

P7. The method of any of solutions P1 to P6, wherein the media segment comprises video comprising one or more pictures, and wherein the portion of the media segment corresponds to one or more slices, subpictures, tiles, coding tree units or coding tree unit rows.

P8. The method of solution P7, wherein the portion of the media segment comprises an interior portion of a video picture and wherein the performing the verification includes computing a hash of pixel values for all pixels in the interior portion in an order.

P9. The method of solution P8, wherein the order is specified in the encoded representation.

P10. The method of solution P8, wherein the order is pre-specified and is a zigzag or a raster scan order.

P11. The method of any of solutions P1 to P10, wherein the processing the portion of the media segment includes decoding the media segment.

P12. The method of any of solutions P1 to P11, wherein the presenting the decoded version comprises presenting only portions of the encoded representation that pass the verification.

P13. The method of any of solutions P1 to P11, wherein the presenting the decoded version comprises omitting from the presentation portions of the media segment for whom the result of the verification is not positive.

P14. The method of any of solutions P1 to P11, wherein the presenting the decoded version comprises presenting the media segment and an indication of the result of the verification.

P15. A method of digital media processing, comprising generating an encoded representation of a media segment; generating a verification information for a portion of the media segment that enables a verification of integrity of the encoded representation of the media segment; and providing the encoded representation and the verification information for verification and presentation of the media segment by media decoders.

P16. The method of solution P15, wherein the verification includes comparing a secure hash value of a decoded version of the portion with a secure hash values included with the encoded representation.

P17. The method of solution P15, wherein the verification includes authenticating a digital signature of the encoded representation of the media segment and/or the portion of the media segment.

P18. The method of solution P15, wherein the encoded representation of the media segment includes timestamps that and verification is performed by verifying integrity of the timestamps by obtaining secure information from a trusted source and verifying that the secure information matches the timestamps.

P19. The method of any of solutions P15 to P18, wherein the encoded representation carries a syntax element indicative of the portion of the media segment.

P20. The method of solution P19, wherein the syntax element comprises a supplemental enhancement information (SEI).

P21. The method of any of solutions P15 to P20, wherein the media segment comprises video comprising one or more pictures, and wherein the portion of the media segment corresponds to one or more slices, subpictures, tiles, coding tree units or coding tree unit rows.

P22. The method of solution P21, wherein the portion of the media segment comprises an interior portion of a video picture and wherein the performing the verification includes computing a hash of pixel values for all pixels in the interior portion in an order.

P23. The method of solution P22, wherein the order is specified in the encoded representation.

P24. The method of solution P22, wherein the order is pre-specified and is a zigzag or a raster scan order.

P25. The method of any of solutions P15 to P24, wherein the processing the portion of the media segment includes decoding the media segment.

P26. The method of any of solutions P15 to P25, wherein the presenting the decoded version comprises presenting only portions of the encoded representation that pass the verification.

P27. The method of any of solutions P15 to P26, wherein the presenting the decoded version comprises omitting from the presentation portions of the media segment for whom the result of the verification is not positive.

P28. The method of any of solutions P15 to P26, wherein the presenting the decoded version comprises presenting the media segment and an indication of the result of the verification.

P29. A method of video processing, comprising performing a conversion between a media segment and a bitstream representation of the video segment, wherein the conversion conforms to a format rule or an encryption rule.

P30. The method of solution P29, wherein the bitstream includes a secure hash function result of the media segment.

P31. The method of any of solutions P29 to P30, wherein the bitstream includes an encrypted version of an underlying coded video stream.

P32. The method of solution P31, wherein the encrypted version is based on a DSA or an RSA or an ECDSA encryption/decryption protocol.

P33. The method of any of solutions P1 to P32, wherein the media segment is one or more network abstraction layers (NAL) of a video.

P34. The method of any of solutions P1 to P32, wherein the media segment corresponds to a video layer.

P35. The method of any of solutions P1 to P32, wherein the media segment represents a region of a video.

P36. The method of any of solutions P1 to P32, wherein the media segment is a video.

P37. The method of solutions P1 to P32, wherein the media segment is an audio.

P38. The method of solutions P1 to P32, wherein the media segment is an image.

P39. The method of any of solutions P1 to P31, wherein the portion of the media segment comprises spatial portions of the media segment.

P40. The method of any of solutions P1 to P39, wherein the portion of the media segment comprises temporal portions of the media segment.

P41. The method of any of solutions P1 to P39, wherein the portion of the media segment comprises less than entirety of the media segment.

P42. The method of any of solutions P1 to P39, wherein the portion of the media segment comprises all of the media segment.

P43. A media processing apparatus comprising a processor configured to implement a method recited in any one or more of solutions P1 to P42.

P44. A computer program product comprising a computer readable medium having code stored thereon, the code, upon execution by a processor, causing the processor to implement a method recited in any one or more of solutions P1 to P42.

P45. A method, apparatus or system described in the present document.

Another listing of solutions preferred by some embodiments is provided next.

1. A method of digital media processing, comprising performing a conversion between a media segment and a bitstream of the media segment, wherein the conversion conforms to a format rule and an encryption rule, and wherein the format rule specifies that verification information, which comprises an indication of an integrity of a portion of the media segment, is signaled in the bitstream.

2. The method of solution 1, wherein the verification information comprises one or more secure hash values.

3. The method of solution 2, further comprising computing, based on the bitstream, one or more reconstructed secure hash values; and comparing the one or more reconstructed secure hash values to the one or more secure hash values.

4. The method of solution 3, wherein the one or more reconstructed secure hash values being equal to the one or more secure hash values is indicative of the integrity of the portion of the media segment being maintained.

5. The method of solution 3, wherein the one or more reconstructed secure hash values being different from the one or more secure hash values is indicative of the integrity of the portion of the media segment not being maintained.

6. The method of any of solutions 1 to 5, wherein a region of a current picture of the media segment corresponds to a slice, a subpicture, a tile, a coding tree unit (CTU), or a CTU row.

7. The method of solution 6, wherein the bitstream comprises an indication of the region.

8. The method of solution 7, wherein the indication comprises a top-left coordinate or a bottom-right coordinate of the region relative to a picture comprising the region.

9. The method of solution 7, wherein the indication comprises a top-left coordinate or a bottom-right coordinate of a region specified using a top-left coordinate or a bottom-right coordinate of a unit in the media segment.

10. The method of solution 9, wherein the unit is a coding tree block (CTB) or a coding tree unit (CTU).

11. The method of solution 7, where the region is a subpicture, and wherein the indication comprises an index of the subpicture.

12. The method of solution 7, wherein the one or more secure hash values comprise a secure hash value of all pixels of the region in an order.

13. The method of solution 12, wherein the order is a raster scanning order.

14. The method of solution 12, wherein the order is a decoding order.

15. The method of solution 12, wherein the order comprises an ascending order or a descending order of indices of regions of the media segment.

16. The method of solution 6, wherein the integrity of the portion of the media segment is further based on multiple regions in multiple pictures in the media segment, a relative position of each of the multiple regions being identical to a relative position of the region in the current picture.

17. The method of solution 16, wherein the bitstream comprises a single indication comprising coordinates applicable to the region and each of the multiple regions.

18. The method of solution 6, wherein the integrity of the portion of the media segment is further based on multiple regions in multiple pictures in the media segment, a relative position of each of the multiple regions being different from a relative position of the region in the current picture.

19. The method of solution 6, wherein the integrity of the region is based on a direct comparison of the one or more secure hash values.

20. The method of any of solutions 2 to 5, wherein the verification information further comprises a private key encrypted message of the one or more secure hash values indicative of a source of the bitstream.

21. The method of any of solutions 1 to 5, wherein the verification information further comprises a private key encrypted message of a region of a current picture.

22. The method of any of solutions 1 to 5, wherein the verification information further comprises a private key encrypted message of a checksum or cyclic redundancy check (CRC) of a region of a current picture.

23. The method of any of solutions 2 to 5, wherein the verification information further comprises a trusted timestamping message comprising the one or more hash secure hash values timestamped by a time stamping authority (TSA).
24. The method of solution 6, wherein a definition of the region comprises a starting point, a region height, and a region width.
25. The method of solution 6, wherein a definition of the region comprises a starting point and a predefined closed shape.
26. The method of any of solutions 1 to 5, wherein the verification information is sent in a supplemental enhancement information (SEI) message.
27. The method of solution 6, further comprising outputting whether secure hash values of the region match the one or more secure hash values.
28. The method of solution 6, further comprising outputting whether secure hash values of the region, independent of a starting point of the region, match the one or more secure hash values.
29. The method of any of solutions 1 to 28, wherein the media segment is a video segment.
30. The method of any of solutions 1 to 28, wherein the media segment is an audio segment.
31. The method of any of solutions 1 to 28, wherein the media segment is an image.
32. The method of any of solutions 1 to 5, wherein the media segment is an audio signal that is defined using a start time and a duration of the audio signal.
33. The method of solution 32, wherein an audio decoder is configured to output an indication of whether secure hash values of the audio signal match the one or more secure hash values.
34. The method of solution 32, wherein an audio decoder is configured to output an indication of whether secure hash values of the audio signal, independent of a starting point of the audio signal, match the one or more secure hash values.
35. The method of any of solutions 1 to 5, wherein the media segment is a video signal that is defined as a set of consecutive pictures in a display order.
36. The method of solution 35, wherein a video decoder is configured to output an indication of whether secure hash values of the video signal match the one or more secure hash values.
37. The method of solution 35, wherein a video decoder is configured to output an indication of whether secure hash values of the video signal, independent of a starting point of the video signal, match the one or more secure hash values.
38. The method of solution 34 or 35, wherein, subsequent to decoding the bitstream, the media segment is played in a predetermined order.
39. The method of solution 34 or 35, wherein, subsequent to decoding the bitstream, the media segment is played at a speed with a precision different from the source speed.
40. The method of any of solutions 1 to 39, wherein the media segment is in one network abstraction layer (NAL) unit.
41. The method of any of solutions 1 to 39, wherein the media segment is in a video coding layer network abstraction layer (NAL) unit.
42. The method of any of solutions 1 to 39, wherein the media segment is in multiple network abstraction layer (NAL) units.
43. The method of any of solutions 1 to 39, wherein the encryption rule specifies applying at least one of a digital signature algorithm (DSA), a Rivest Shamir Adleman (RSA) algorithm, and an elliptical curve digital signature algorithm (ECDSA) to a portion of the media segment.
44. The method of any of solutions 1 to 39, wherein a generation of the one or more secure hash values is based on Federal Information Processing Standard (FIPS) 180-4 or FIPS 202.
45. The method of any of solutions 1 to 5, wherein the encryption rule specifies applying at least one of a digital signature algorithm (DSA), a Rivest Shamir Adleman (RSA) algorithm, and an elliptical curve digital signature algorithm (ECDSA) to a reconstruction of an identical region in one or more pictures of the media segment.
46. The method of solution 45, wherein the at least one of the DSA, the RSA or the ECDSA is applied to the reconstruction until a cancelling flag in a supplemental enhancement information (SEI) message in the bitstream is true.
47. The method of any of solutions 1 to 5, wherein the format rule specifies that a region of the media segment is subject to a constraint.
48. The method of solution 47, wherein the constraint specifies that a horizontal component and a vertical component of an upper-left point of the region are non-negative integers.
49. The method of solution 47, wherein the constraint specifies that the region is within a picture or a subpicture.
50. The method of solution 47, wherein the constraint specifies that the region is measured in chroma units or luma units.
51. The method of solution 47, wherein the constraint specifies that the region is defined using coordinates of a top-left location, a width, and a height.
52. The method of solution 47, wherein the constraint specifies that the region is defined using a starting point of a top-left location and an ending point of a bottom-right location.
53. The method of solution 47, wherein the constraint specifies that the region is defined using (H-K) and (W-K), wherein H is a height of the region, W is a width of the region, and K is an integer.
54. The method of solution 53, wherein K=1.
55. The method of any of solutions 1 to 5, wherein the encryption rule specifies that the verification information further comprises one or more public keys.
56. The method of solution 55, wherein at least one public key of the one or more public keys is sent in a supplemental enhancement information (SEI) message.
57. The method of any of solutions 1 to 5, wherein the encryption rule specifies that the verification information comprises one or more parameters related to a digital signature algorithm (DSA) or an elliptical curve digital signature algorithm (ECDSA).
58. The method of solution 57, wherein at least one parameter of the one or more parameters is sent in a supplemental enhancement information (SEI) message.
59. The method of any of solutions 1 to 5, wherein the encryption rule specifies an application of a Rivest Shamir Adleman (RSA) algorithm, and wherein an RSA signature is binarized in a big-endian manner or a little-endian manner.
60. The method of any of solutions 1 to 5, wherein the encryption rule specifies an application of a digital signature algorithm (DSA) or an elliptical curve digital signature algorithm (ECDSA), and wherein r and s are parameters of a digital signature for the DSA or the ECDSA.
61. The method of solution 60, wherein r and s are binarized in a big-endian manner.
62. The method of solution 60, wherein r and s are binarized in a little-endian manner.
63. The method of any of solutions 60 to 62, wherein r is binarized before s.
64. The method of any of solutions 60 to 62, wherein r is after before s.
65. The method of any of solutions 1 to 5, wherein the encryption rule specifies that a digital signature associated with an encryption technique is byte-aligned in the bitstream.
66. The method of solution 65, wherein the digital signature is byte-aligned in a supplemental enhancement information (SEI) message.
67. The method of any of solutions 1 to 66, wherein the encryption rule specifies no encryption.
68. The method of any of solutions 1 to 67, wherein the conversion comprises decoding the media segment from the bitstream.
69. The method of any of solutions 1 to 67, wherein the conversion comprises encoding the media segment into the bitstream.
70. A method of storing a bitstream representing a media segment to a computer-readable recording medium, comprising generating the bitstream from the media segment according to a method described in any one or more of solutions 1 to 67; and writing the bitstream to the computer-readable recording medium.
71. A media processing apparatus comprising a processor configured to implement a method recited in any one or more of solutions 1 to 70.
72. A computer-readable medium having instructions stored thereon, the instructions, when executed, causing a processor to implement a method recited in one or more of solutions 1 to 70.
73. A computer readable medium that stores the bitstream generated according to any one or more of solutions 1 to 70.
74. A media processing apparatus for storing a bitstream, wherein the media processing apparatus is configured to implement a method recited in any one or more of solutions 1 to 70.

In the present document, the term "media processing" may refer to media encoding, media decoding, media compression or media decompression. The term media may refer to video, audio or image. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array (FPGA) or an application specific integrated circuit (ASIC).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and compact disc, read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of digital media processing, comprising:
    performing a conversion between a media segment and a bitstream of the media segment,
    wherein the conversion conforms to a format rule and an encryption rule,
    wherein the format rule specifies that verification information, which comprises an indication of an integrity of a portion of the media segment, is signaled in the bitstream,
    wherein the verification information comprises one or more secure hash values, and
    wherein the verification information is sent in a supplemental enhancement information (SEI) message.

2. The method of claim 1, further comprising:
    computing, based on the bitstream, one or more reconstructed secure hash values; and
    comparing the one or more reconstructed secure hash values to the one or more secure hash values,
    wherein the one or more reconstructed secure hash values being equal to the one or more secure hash values is indicative of the integrity of the portion of the media segment being maintained, and
    wherein the one or more reconstructed secure hash values being different from the one or more secure hash values is indicative of the integrity of the portion of the media segment not being maintained.

3. The method of claim 1, wherein a region of a current picture of the media segment corresponds to a slice, a subpicture, a tile, a coding tree unit (CTU), or a CTU row, wherein the bitstream comprises an indication of the region,
    wherein the indication comprises a top-left coordinate or a bottom-right coordinate of the region relative to a picture comprising the region, or
    wherein the indication comprises a top-left coordinate or a bottom-right coordinate of the region specified using a top-left coordinate or a bottom-right coordinate of a unit in the media segment.

4. The method of claim 1, wherein the one or more secure hash values comprise a secure hash value of all pixels of a region in an order, and
    wherein the order is a raster scanning order, a decoding order, an ascending order, or a descending order of indices of regions of the media segment.

5. The method of claim 1, wherein the integrity of the portion of the media segment is further based on multiple regions in multiple pictures in the media segment, a relative position of each of the multiple regions being identical to a relative position of a region in a current picture, wherein the bitstream comprises a single indication comprising coordinates applicable to the region and each of the multiple regions, or
    wherein the integrity of the portion of the media segment is further based on multiple regions in multiple pictures in the media segment, a relative position of each of the multiple regions being different from a relative position of the region in the current picture, and
    wherein the integrity of the region is based on a direct comparison of one or more secure hash values.

6. The method of claim 1, wherein the verification information further comprises a private key encrypted message of one or more secure hash values indicative of a source of the bitstream,
    wherein the verification information further comprises a private key encrypted message of a region of a current picture,
    wherein the verification information further comprises a private key encrypted message of a checksum or cyclic redundancy check (CRC) of the region of the current picture, and
    wherein the verification information further comprises a trusted timestamping message comprising the one or more hash secure hash values timestamped by a time stamping authority (TSA).

7. The method of claim 3, wherein a definition of the region comprises a starting point, a region height, and a region width, or
    wherein the definition of the region comprises the starting point and a predefined closed shape.

8. The method of claim 3, further comprising:
    outputting whether secure hash values of the region match the one or more secure hash values, or
    outputting whether the secure hash values of the region, independent of a starting point of the region, match the one or more secure hash values.

9. The method of claim 1, wherein the media segment is an audio signal that is defined using a start time and a duration of the audio signal,
    wherein an audio decoder is configured to output an indication of whether secure hash values of the audio signal match the one or more secure hash values, or
    wherein the audio decoder is configured to output an indication of whether secure hash values of the audio signal, independent of a starting point of the audio signal, match the one or more secure hash values.

10. The method of claim 1, wherein the media segment is a video signal that is defined as a set of consecutive pictures in a display order,
   wherein a video decoder is configured to output an indication of whether secure hash values of the video signal match the one or more secure hash values, or
   wherein the video decoder is configured to output an indication of whether secure hash values of the video signal, independent of a starting point of the video signal, match the one or more secure hash values.

11. The method of claim 1, wherein the encryption rule specifies applying at least one of a digital signature algorithm (DSA), a Rivest Shamir Adleman (RSA) algorithm, and an elliptical curve digital signature algorithm (ECDSA) to a reconstruction of an identical region in one or more pictures of the media segment, and
   wherein the at least one of the DSA, the RSA or the ECDSA is applied to the reconstruction until a cancelling flag in a supplemental enhancement information (SEI) message in the bitstream is true.

12. The method of claim 1, wherein the format rule specifies that a region of the media segment is subject to a constraint,
   wherein the constraint specifies that a horizontal component and a vertical component of an upper-left point of the region are non-negative integers,
   wherein the constraint specifies that the region is within a picture or a subpicture,
   wherein the constraint specifies that the region is measured in chroma units or luma units,
   wherein the constraint specifies that the region is defined using coordinates of a top-left location, a width, and a height,
   wherein the constraint specifies that the region is defined using a starting point of the top-left location and an ending point of a bottom-right location, or
   wherein the constraint specifies that the region is defined using (H-K) and (W-K), wherein H is the height of the region, W is the width of the region, and K is an integer, and K=1.

13. The method of claim 1, wherein the encryption rule specifies that the verification information further comprises one or more public keys,
   wherein at least one public key of the one or more public keys is sent in a supplemental enhancement information (SEI) message,
   wherein the encryption rule specifies that the verification information comprises one or more parameters related to a digital signature algorithm (DSA) or an elliptical curve digital signature algorithm (ECDSA), and
   wherein at least one parameter of the one or more parameters is sent in a supplemental enhancement information (SEI) message.

14. The method of claim 1, wherein the encryption rule specifies an application of a Rivest Shamir Adleman (RSA) algorithm, and wherein an RSA signature is binarized in a big-endian manner or a little-endian manner, and
   wherein the encryption rule specifies an application of a digital signature algorithm (DSA) or an elliptical curve digital signature algorithm (ECDSA), and wherein r and s are parameters of a digital signature for the DSA or the ECDSA,
   wherein r and s are binarized in a big-endian manner,
   wherein r and s are binarized in a little-endian manner,
   wherein r is binarized before s, or
   wherein r is binarized after before-s.

15. The method of claim 1, wherein the encryption rule specifies that a digital signature associated with an encryption technique is byte-aligned in the bitstream, and the digital signature is byte-aligned in a supplemental enhancement information (SEI) message, or
   wherein the encryption rule specifies no encryption.

16. The method of claim 1, wherein the conversion includes encoding the media segment into the bitstream.

17. The method of claim 1, wherein the conversion includes decoding the media segment from the bitstream.

18. An apparatus for processing digital media comprising a processor and a non-transitory memory with instructions thereon, wherein the instructions upon execution by the processor, cause the processor to:
   perform a conversion between a media segment and a bitstream of the media segment,
   wherein the conversion conforms to a format rule and an encryption rule,
   wherein the format rule specifies that verification information, which comprises an indication of an integrity of a portion of the media segment, is signaled in the bitstream,
   wherein the verification information comprises one or more secure hash values, and
   wherein the verification information is sent in a supplemental enhancement information (SEI) message.

19. A non-transitory computer-readable recording medium storing a bitstream of a media segment which is generated by a method performed by a digital media processing apparatus, wherein the method comprises:
   generating the bitstream of the media segment,
   wherein the generation conforms to a format rule and an encryption rule,
   wherein the format rule specifies that verification information, which comprises an indication of an integrity of a portion of the media segment, is signaled in the bitstream,
   wherein the verification information comprises one or more secure hash values, and
   wherein the verification information is sent in a supplemental enhancement information (SEI) message.

* * * * *